United States Patent
Mäkelä et al.

(10) Patent No.: US 7,565,264 B2
(45) Date of Patent: Jul. 21, 2009

(54) PREDICTIVE PROBABILITY ARRANGEMENT FOR LOADING FILES OVER AN INTERFACE

(76) Inventors: Jakke Mäkelä, Vanha Hämeentie 101 D 61, FI-20540, FI-20540 Turku (FI); Jukka-Pekka Vihmalo, Näreikönkatu 18 E 2, FI-33820, Tampere (FI); Marko Ahvenainen, Viserryskuja 10 B 6, FI-36110 Ruutana (FI)

( * ) Notice: Subject to any disclaimer, the term of this patent is extended or adjusted under 35 U.S.C. 154(b) by 327 days.

(21) Appl. No.: 10/535,074

(22) PCT Filed: Dec. 1, 2003

(86) PCT No.: PCT/FI03/00913

§ 371 (c)(1),
(2), (4) Date: May 5, 2006

(87) PCT Pub. No.: WO2004/051494

PCT Pub. Date: Jun. 17, 2004

(65) Prior Publication Data

US 2006/0248217 A1   Nov. 2, 2006

(51) Int. Cl.
G06F 17/18   (2006.01)
(52) U.S. Cl. .......... 702/181
(58) Field of Classification Search ............ 702/181
See application file for complete search history.

(56) References Cited

U.S. PATENT DOCUMENTS 6,567,855 B1   5/2003   Tubbs et al. ............ 709/232
2002/0107853 A1 *   8/2002   Hofmann et al. ........... 707/7
2003/0126232 A1   7/2003   Mogul et al. ............. 709/219

FOREIGN PATENT DOCUMENTS

WO   WO 00/72518 A1   11/2000

OTHER PUBLICATIONS

"WebCompanion: A Friendly Cliend-Side Web Prefetching Agent", Reinhard P. Klemm, IEEE Transactions on Knowledge and Data Engineering, vol. 11, No. 4, Jul./Aug. 1999, pp. 577-594.
"Power-Aware Prefetch in Mobile Environments", Liangzhong Yin, et al., Computer Society, Proceedings of the 22nd International Conference on Distributed Computing Systems, pp. 1-8.

* cited by examiner

Primary Examiner—Tung S Lau
Assistant Examiner—Aditya Bhat
(74) Attorney, Agent, or Firm—Connolly Bove Lodge & Hutz LLP

(57) ABSTRACT

A method, system, device and software products for loading files or clips thereof from a unit including files or clips thereof over at least one interface to a data-processing unit. The arrangement according to the invention includes determining joint probabilities of the files or parts ("clips") thereof, energy consumptions caused by their loading and a value for maximum energy consumption. A loading order is formed for the files or clips thereof as a function of the joint probabilities. Files or clips thereof are loaded over at least one interface in the loading order, and total energy consumption caused by the loading is determined until the value of the total energy consumption exceeds the value of the maximum energy consumption. At this point, loading of the files or clips thereof is interrupted.

17 Claims, 7 Drawing Sheets

PREDICTIVE PROBABILITY ARRANGEMENT FOR LOADING FILES OVER AN INTERFACE

This application is the National Stage of International Application No. PCT/FI2003/000913, International Filing Date, Dec. 1, 2003, which designated the United States of America, and which international application was published under PCT Article 21(2) as WO Publication No. WO 2004/051494 A1 and which claims priority from Finnish Application No. 20022116, filed Nov. 29, 2002.

FIELD OF THE INVENTION

The invention relates to a probability arrangement and particularly to a predictive probability arrangement in data transmission taking place over an interface.

BACKGROUND OF THE INVENTION

More and more versatile and effective user applications are required of electronic devices nowadays, whereby the electronic device must be able to process large amounts of data. A mobile phone, for instance, is no longer used merely for speaking, but also as a calendar, an Internet browser, a camera or a game device, for example. Such numerous user applications require faster data transmission capability and improved efficiency in energy consumption.

Interfaces between electronic devices and between components of electronic devices, particularly interfaces between memories, have an essential significance for the data transmission capability of the whole electronic device. Larger amounts of data are transmitted over the interfaces, whereby the problem in the solutions according to prior art is, in particular, the limited bandwidth of the interfaces, which makes the data transmission significantly slower. On the other hand, an electronic device may have a sufficient nominal bandwidth, but problems due to software, for example, may load the interface so much that the data transmission rate of the interface is insufficient for other functions. In prior art solutions, a problem is, in addition, that a large part of the transmitted data may be unnecessary, which causes undue energy consumption and waste of bandwidth. When the band is loaded with unnecessary data transmission, the data transmission rate is reduced, whereby also the transmission of necessary data slows down.

With the known solutions of publications JP1 1306238 and U.S. Pat. No. 5,553,284, a loading factor is determined for loading a file over an interface, the factor being the minimum probability the file must have in order for it to be loaded. The problem in these solutions is, however, that the energy consumption caused by the file loading is not estimated, but the loading is carried out only on the basis of joint probabilities.

BRIEF DESCRIPTION OF THE INVENTION

An object of the invention is thus to provide a method and a system implementing the method in such way that disadvantages of the above-mentioned problems can be reduced. The object of the invention is achieved with a method, system, device and software that are characterized in what is stated in the independent claims. Preferred embodiments of the invention are described in the dependent claims.

The invention is based on loading files $F_i$ or parts ("clips") $C_i$ thereof over an interface IF from a unit FU comprising files $F_i$ or clips $C_i$ thereof to a data-processing unit DU. In this context, the unit FU that comprises files $F_i$ or clips $C_i$, thereof refers to, for example, a server S, memory device M or any other unit comprising data. The data-processing unit DU, in turn, refers to a mobile station T, memory device M or any other unit arranged to process data. The predictive probability system according to the invention comprises determining joint probabilities $JP_i$ of at least two files $F_i$ or clips $C_i$ thereof, which probabilities express probabilities with which the files $F_i$ or clips $C_i$ thereof are accessed, and energy consumptions $W_i$ caused by the loading of the files $F_i$ or clips $C_i$ thereof. A loading order for the files $F_i$ or clips $C_i$ thereof is formed as a function of the joint probabilities $JP_i$. In addition, a value is determined for maximum energy consumption $EC_{MAX}$, expressing greatest allowed energy consumption caused by the loading. Files $F_i$ or clips $C_i$ thereof are loaded in the loading order, and at the same time, total energy consumption $\Sigma W_i$ caused by the loading of said files $F_i$ or clips $C_i$ thereof is determined until the value of the total energy consumption $\Sigma W_i$ exceeds the value of the maximum energy consumption $EC_{MAX}$.

According to a preferred embodiment of the invention, the loading probabilities $LP_i$ of the files $F_i$ or clips $C_i$ thereof are determined from the joint probabilities $JP_i$, and according to a second preferred embodiment, the loading probability functions $fLP_i$ of the files $F_i$ or clips $C_i$ thereof are determined either as functions of the loading probabilities $LP_i$ or as functions of the energy consumptions $W_i$ caused by the loading.

According to a preferred embodiment of the invention, at least one file $F_i$ or a clip $C_i$ thereof is loaded over an interface from a first terminal to a second terminal.

According to a preferred embodiment of the invention, the device comprises proxy functionality, wherein the proxy functionality is arranged to transmit at least one file $F_i$ or a clip $C_i$ thereof to another data-processing unit as a response to a request from the data-processing unit.

Significant advantages are achieved with the arrangement according to the invention. One advantage is that the predictive probability arrangement enables the user and/or the arrangement to determine a substantially optimal arrangement between the access and loading times and the energy consumption caused by the loading. An advantage is also that predictive probability arrangement makes it possible to essentially reduce energy losses by loading in advance files that will be needed most probably; in other words, files are not loaded only in the order in which they appear. A further advantage is that as a result of the loading of the files most probably needed, excessive use of bandwidth can be reduced, whereby the operational rates of the interface increase significantly, reaching in some cases even the level of the operational rates of a high-speed interface. One advantage is that the arrangement allows efficient use of a slow interface, which can result in significant energy savings and reduced needed bandwidth. An advantage is also that the arrangement takes user cost into account for example by using cheap local network for data transmission. A further advantage is that the proxy can be made mobile as well, which means that the devices involved can function as each other's proxies.

BRIEF DESCRIPTION OF THE FIGURES

The invention will now be described in more detail in connection with preferred embodiments, with reference to the attached drawings, of which.

DETAILED DESCRIPTION OF THE INVENTION

Figure 1:
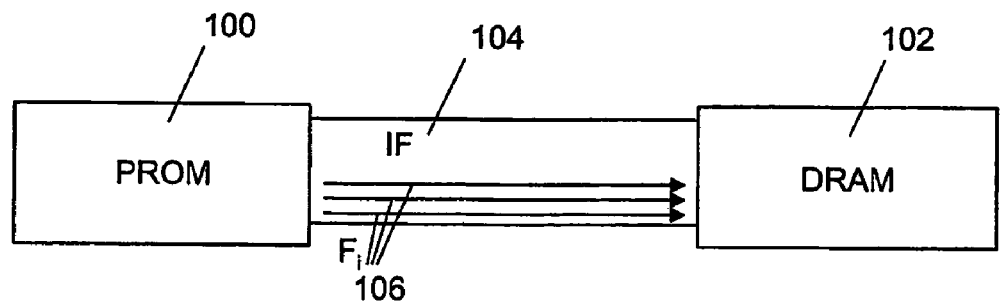
FIG. 1 shows a simple system comprising a PROM memory, a DRAM memory and a slow interface between them.

Interfaces, such as interfaces between electronic devices and between components of electronic devices, for example memories, have a great significance for the performance of the whole system, such as a terminal, and particularly for data transmission rates and energy consumption. In electronic devices, memories are generally used for storing data. Different, types of memory differ from each other mostly with regard to their operational rate, storing capacity and preservability of the stored data. Therefore, electronic devices generally comprise several different memories for different objects of use.

Memories can be divided into volatile and non-volatile memories on the basis of their operation. When the power supply is interrupted, a volatile memory generally loses all data it has stored, but a non-volatile memory typically preserves the data it has stored.

RAM memories (Random Access Memory) are usually volatile memories in which data can be entered and read when the power source is switched on. The main memory of the central unit of an electronic device, used particularly for storing programs used by the central unit and immediate results of data processing, is generally fast RAM memory.

The RAM memories can be further divided into SRAM memories (Static Random Access Memory) and DRAM memories (Dynamic Random Access Memory). In a SRAM memory cell, data is typically stored in a flip-flop comprising generally four to six transistors. The structure of a SRAM memory is thus complex and takes a lot of space. A SRAM memory is used particularly for executing a program code and as a cache memory because of its speed and low power consumption.

A DRAM memory cell typically comprises one capacitor, in which data is stored as electric charge, and a MOSFET transistor (Metal Oxide Semiconductor Field Effect Transistor), which functions as a switch when the capacitor is charged and discharged. Owing to its simple structure, a DRAM memory is small in size and inexpensive. In order to function, a DRAM memory requires refresh functionality, i.e. recharging of the capacitor, at given intervals. Despite the refresh functionality, the DRAM memory is fast, and it is used particularly for storing data temporarily. Several fast memory types, such as a synchronous DRAM memory (Synchronous Dynamic Random Access Memory), have been developed from the DRAM memory.

A ROM memory (Read Only Memory) is a non-volatile read-only memory, which preserves the data it has stored although the power source is switched off. Storing data in a ROM memory can be permanent or reprogrammable, depending on the manufacturing technology of the ROM memory. The ROM memories can be divided into mask ROM memories, PROM memories (Programmable Read Only Memory) and EPROM memories (Erasable and Programmable Read Only Memory). ROM memories are fast and their power consumption is usually low, but they are still rather expensive. ROM memories are used particularly for mass-storing permanent data, such as for storing programs and microcodes.

In addition to the memory components presented here, there is a large number of other memory types to which predictive probability arrangement according to the invention can be applied. These include for instance rotating memory types, such as hard disks.

The predictive probability arrangement according to the invention can preferably be used to optimize energy-consuming data transmission particularly over a slow interface.

The predictive probability arrangement according to the invention can be implemented for instance in electronic devices comprising, according to FIG. 1, two memory components $M_1$ and $M_2$, such as a PROM memory (100), which is a large non-volatile memory, and a DRAM memory (102), which is a fast execution memory, there being a slow interface IF (104) between them, over which discrete files $F_i$ (106) or clips $C_i$ thereof are loaded.

The predictive probability arrangement is advantageous especially when the interface IF (104) is slow compared with the size of the files $F_i$ or clips $C_i$ thereof. Loading large files $F_i$ (106) or clips $C_i$ thereof over the slow interface IF (104), for example by commanding, would be slow, which would cause a slow access time of the functionality of applications for the user. Preferably, the files $F_i$ or clips $C_i$ thereof to be loaded have some kind of statistical or logical interdependency. The interdependency can be, for example, loading of new web pages on the basis of the hypertext links of one web page. The predictive probability arrangement can be used even if such interdependency does not exist.

Figure 2:
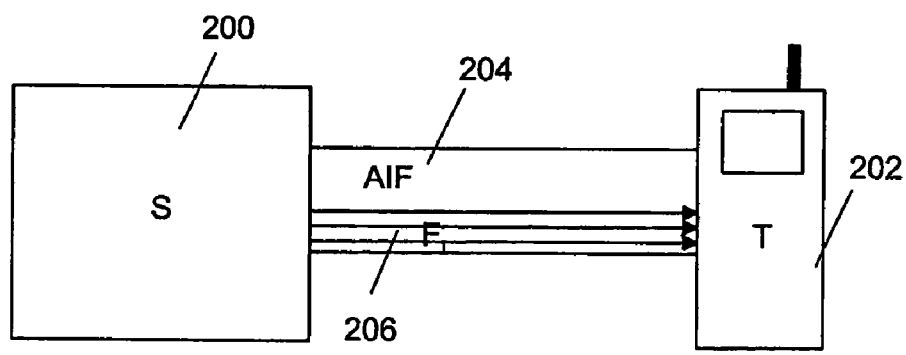
FIG. 2 shows a simple system comprising a server, a terminal and an interface between them.

The predictive probability arrangement according to the invention can be implemented also in the system shown in FIG. 2, comprising for instance a server S (200) and an electronic device, such as a terminal T (202), and an interface IF between them, such as an air interface AIF (204). The server S (200) may comprise a large amount of data linked by means of an Internet connection, for example. Usually, there is room for only a small part of the needed files $F_i$ (206) or clips $C_i$ thereof in the memory of the terminal T (202). Hence, the terminal T (202) can give commands for instance to the server S (200), which can transfer files $F_i$ (206) or clips $C_i$ thereof to the terminal T (202) over the air interface AIF (204).

The predictive probability arrangement can also be utilized for instance in game applications. A game can be directly programmed to use the arrangement according to the invention, for instance when it is decided which structure is next given to the display. By means of the predictive probability arrangement, the very high peak rates of data transmission required by game applications can be achieved by loading some of the most probable files $F_i$ or clips $C_i$ thereof in advance.

Figure 3:
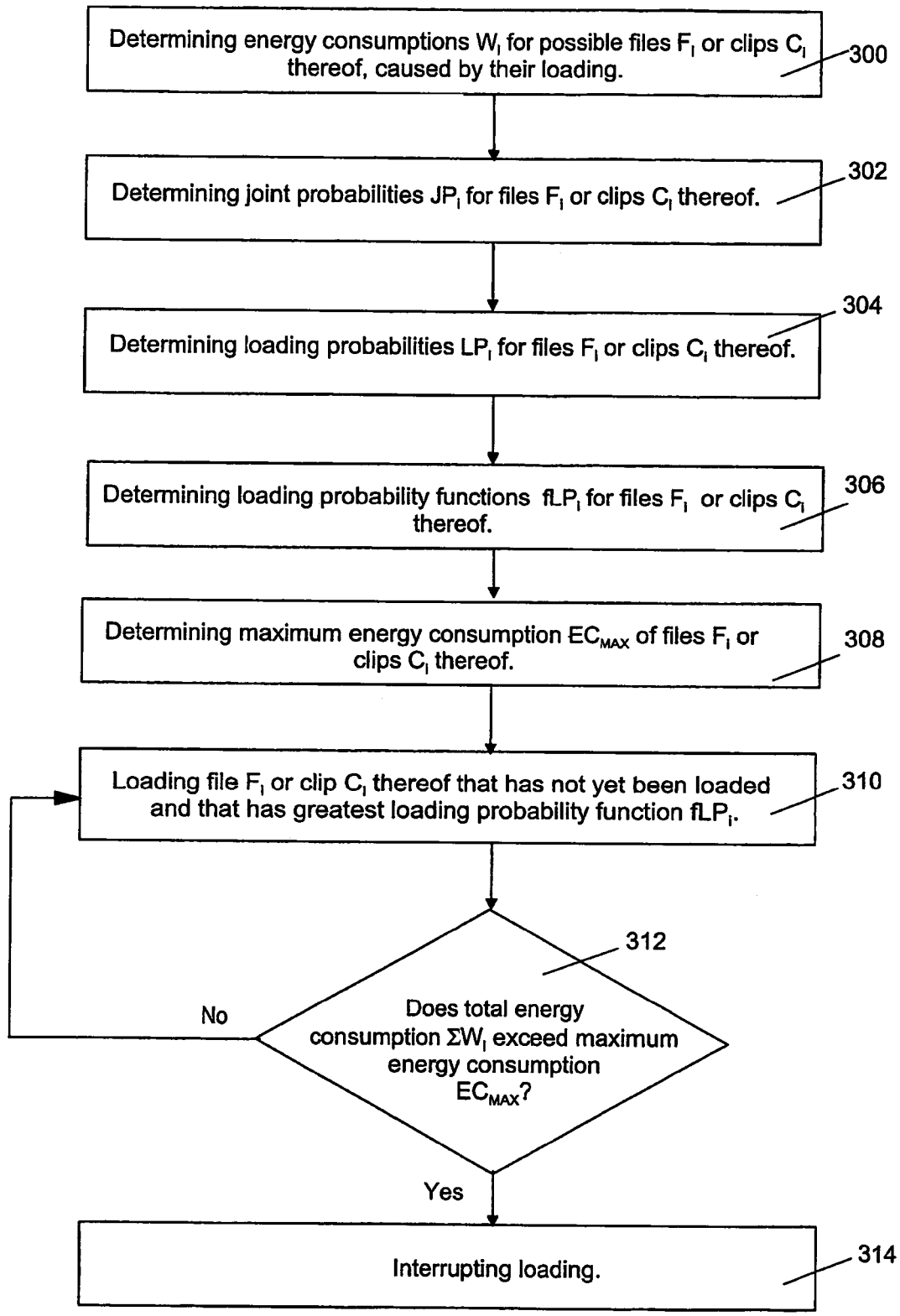
FIG. 3 shows a flow chart of the functionality of a predictive probability method.

FIG. 3 shows a flow chart of the functionality of the predictive probability method according to a preferred embodiment of the invention. First, energy consumptions $W_i$ are determined (300) for possible files $F_i$ or clips $C_i$ thereof on the basis of, for example, the number of bytes, the energy consumptions having been caused by the loading of the files.

The energy consumption $W_i$ can be determined directly as energy, for example, in which case its unit is generally mJ (millijoule). The energy consumption $W_i$ expresses the amount of energy that the file-processing unit DU, such as a terminal T, consumes when it loads a file $F_i$ or a clip $C_i$ thereof. This energy is typically proportional to the length $L_i$ of the file $F_i$ or a clip $C_i$ thereof, whereby the unit of the length is generally kB (kilobyte). In the first approximation, the proportionality is direct, in other words $W_i=k*L_i$, where k is a constant defined experimentally. In a real system, the function can be more complex. Such a situation is possible for example when the interface IF consumes energy when initializing data transmission, or when data is transmitted over the interface IF in packets, in other words not as a continuous flow. The interface IF may also have other non-linear features with respect to the energy consumption. Thus, in a general case $W_i=g(L_i)$, where g is a function, for example an experimentally or theoretically defined function. This dependency is, however, application-specific and does not affect the basic principle of the invention itself. The functional form of the energy consumption $W_i$ is not defined separately here, because it is assumed to be known or empirically determined. In order to illustrate preferred embodiments of the invention, simple design and non-dimensional variables are used in the present application, and the energy consumption is determined directly as the length $W_i=L_i$ of the file or a clip thereof.

Further, joint probabilities $JP_i$, i.e. probabilities with which one moves to a particular file $F_i$, are determined (302) for the files $F_i$ or clips $C_i$ thereof. Determination (302) of the joint probabilities is application-specific. If, for instance, the user has loaded a web page, it can be assumed that the user will next move on to one of the hypertext links of the web page. Thus, it is advantageous to consider loading of the hypertext link at the same time. Even if no relative probabilities could be determined, a predictive probability method can be used for determining which web pages should be loaded. On the other hand, the joint probabilities $JP_i$ of the files $F_i$ or clips $C_i$ thereof can be determined by means of the probability system also on the basis of the web page visiting times achieved with the files $F_i$ or clips $C_i$ thereof.

The loading probabilities $LP_i$ of the files $F_i$ or clips $C_i$ thereof are determined (304) as products of the joint probabilities $JP_i$ of the particular files $F_i$ or clips $C_i$ thereof and the loading probabilities $LP_{i-1}$ of files $F_{i-1}$ or clips $C_{i-1}$ thereof preceding the particular files $F_i$ or clips $C_i$ thereof.

By means of the loading probabilities $LP_i$, so-called loading probability functions $fLP_i$ are determined (306) which are used for determining the loading order. Depending on the application, the loading probability function $fLP_i$ can be, for instance, directly the loading probability $LP_i$ of the file $F_i$ or a clip $C_i$ thereof, the quotient of the loading probability $LP_i$ and the energy consumption $W_i$ or another function of the loading probability $LP_i$. The loading probability function $fLP_i$ is thus application-specific and depends on the requirements set by the user. In addition, maximum energy consumption $EC_{MAX}$ is determined (308) for the predictive probability method, the maximum energy consumption expressing the greatest allowed total energy consumption caused by the loading of the files $F_i$ or clips $C_i$ thereof. The optimal manner of determination and usage of the maximum energy consumption $EC_{MAX}$ depends on the application. The maximum energy consumption $EC_{MAX}$ can be determined for example on the basis of the desired standby time of the device. Great maximum energy consumption $EC_{MAX}$ usually means, in practice, that the device consumes its battery quickly. On the other hand, low maximum energy consumption $EC_{MAX}$ generally means that the algorithm improves the operation of the system only a little, because low maximum energy consumption $EC_{MAX}$ enables loading of only a small amount of data, whereby the probability of the required file $F_i$ or a clip $C_i$ thereof being already charged in advance is lower. The optimal value of maximum energy consumption $EC_{MAX}$ can thus be preferably determined by optimizing these two requirements.

The energy consumptions $W_i$, joint probabilities $JP_i$, loading probabilities $LP_i$, loading probability functions $fLP_i$ and maximum energy consumption $EC_{MAX}$ can be determined in any order relative to each other, with the exception, however, that the loading probability functions $fLP_i$ are determined at a later stage than the loading probabilities $LP_i$, and that the loading probabilities $LP_i$ are determined at a later stage than the joint probabilities $JP_i$.

Power consumptions $W_i$, joint probabilities $JP_i$ and values of the maximum energy consumption $EC_{MAX}$ can preferably be redetermined periodically, on the basis of which the values of the loading probabilities $LP_i$ and the loading probability functions $fLP_i$ can preferably be updated. Loading (310) of the files $F_i$ or clips $C_i$ thereof takes place in the order of loading probability functions from the smallest to the greatest, whereby total energy consumption $\Sigma W_i$ caused by the loading of the files $F_i$ or clips $C_i$ thereof is determined. When it is detected in the comparison (312) that the value of the total energy consumption $\Sigma W_i$ caused by the loading of the files $F_i$ or clips $C_i$ thereof is greater than the value of the maximum energy consumption $EC_{MAX}$, the loading of the files $F_i$ or clips $C_i$ thereof is interrupted (314).

If the loading probability functions $fLP_i$ of two or more different files are the same, the loading order can be selected from among these files, for instance randomly. In practice, in such a case, the files $F_i$ or clips $C_i$ thereof can alternatively be left unloaded, particularly when the joint probabilities $JP_i$ of the files $F_i$ or clips $C_i$ thereof are very low and/or the files $F_i$ or clips $C_i$ thereof are not followed by other files to be loaded.

Figure 4:
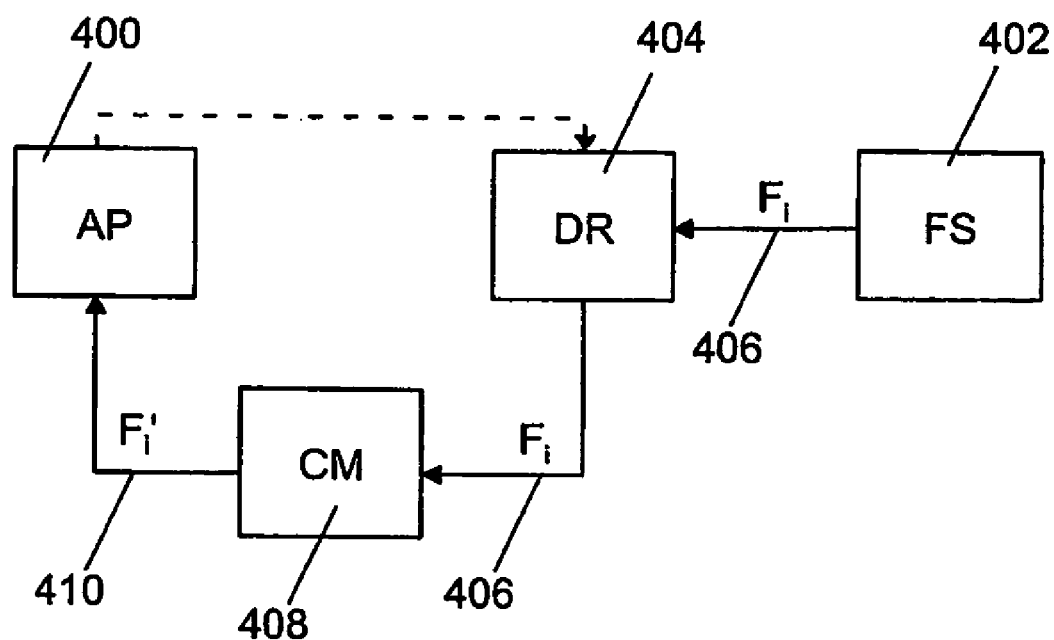
FIG. 4 shows the functionality of a driver for loading a file or clips thereof.

FIG. 4 shows a preferred embodiment of the invention for loading the files $F_i$ or clips $C_i$ thereof over the interface. IF. When the maximum energy consumption $EC_{MAX}=0$, only the files $F_i'$ or clips $C_i'$ thereof that are needed are loaded, whereby no unnecessary energy consumption is caused. However, the system is slow, because the files $F_i'$ or clips $C_i$ thereof possibly needed are not loaded in advance. The maximum energy consumption $EC_{MAX}$ can also be determined to be greater, which speeds up the operation of the system. If the maximum energy consumption $EC_{MAX}>1$, a driver DR (404) preferably in functional connection to an application AP (400) and a file system FS (402), i.e. a system comprising files, loads files $F_i$ (406) or clips $C_i$ thereof in the loading probability function order from the greatest to the smallest from the file system FS (402) to a cache memory CM (408), for instance, until the driver' DR (304) detects that the value of the total energy consumption $\Sigma W_i$ caused by the loading of the files $F_i$ or clips $C_i$ thereof exceeds the value of the maximum energy consumption $EC_{MAX}$, whereby the driver DR (404) interrupts the loading of the files $F_i$ (406) or clips $C_i$ thereof. The files $F_i'$ (410) needed are then, if required, quickly retrievable from the cache memory CM (408) to provide functionality of the application AP (400).

The invention enables thus a user or system to find a substantially optimal arrangement between the access time of the application AP and the total energy consumption $\Sigma W_i$ caused by the loading of the files $F_i$ or clips $C_i$ thereof. If the file $F_i'$ or a clip $C_i$ thereof needed has been loaded in advance in a cache memory CM, for example, the access time for the user is short. If the file $F_i'$ or a clip $C_i'$ thereof needed has not been loaded in advance, its access time is significantly longer. Since, however, the loading of the files $F_i$ or clips $C_i$ thereof consumes energy $W_i$, it is not advantageous to load all possible files $F_i$ or clips $C_i$ thereof in advance. Using a predictive probability system can result in, for instance, a significant reduction in energy consumption while, at the same time, preserving good performance of the system.

The invention will next be explained with reference to a probability tree formed with the predictive probability method according to a preferred embodiment of the invention shown in FIG. 5. Energy consumptions ($W_1$, $W_2$, $W_3$, $W_4$) are determined for the first possible files ($F_1$, $F_2$, $F_3$, $F_4$), which energy consumptions have been caused by the loading of these files. An algorithm according to the invention calculates loading probabilities ($LP_1$, $LP_2$, $LP_3$, $LP_4$) for the files ($F_1$, $F_2$, $F_3$, $F_4$) as a product ($LP_1=JP_1 \times LP_0$, $LP_2=JP_2 \times LP_0$, $LP_3=JP_3 \times LP_0$ and $LP_4=JP_4 \times LP_0$) of the joint probability ($JP_1$, $JP_2$, $JP_3$, $JP_4$) of each file ($F_1$, $F_2$, $F_3$, $F_4$) and the loading probability $LP_0$ of the file ($F_0$) preceding the files ($F_1$, $F_2$, $F_3$, $F_4$). In this preferred embodiment, the loading probability function $fLP_i$ of each file $F_i$ is directly the loading probability $LP_i$ of the file $F_i$. In addition, a value is determined for the maximum energy consumption $EC_{MAX}$. According to FIG. 5, the maximum energy consumption $EC_{MAX}=9$. The above-mentioned values are determined in a corresponding way for other possible files $F_i$.

Figure 5:
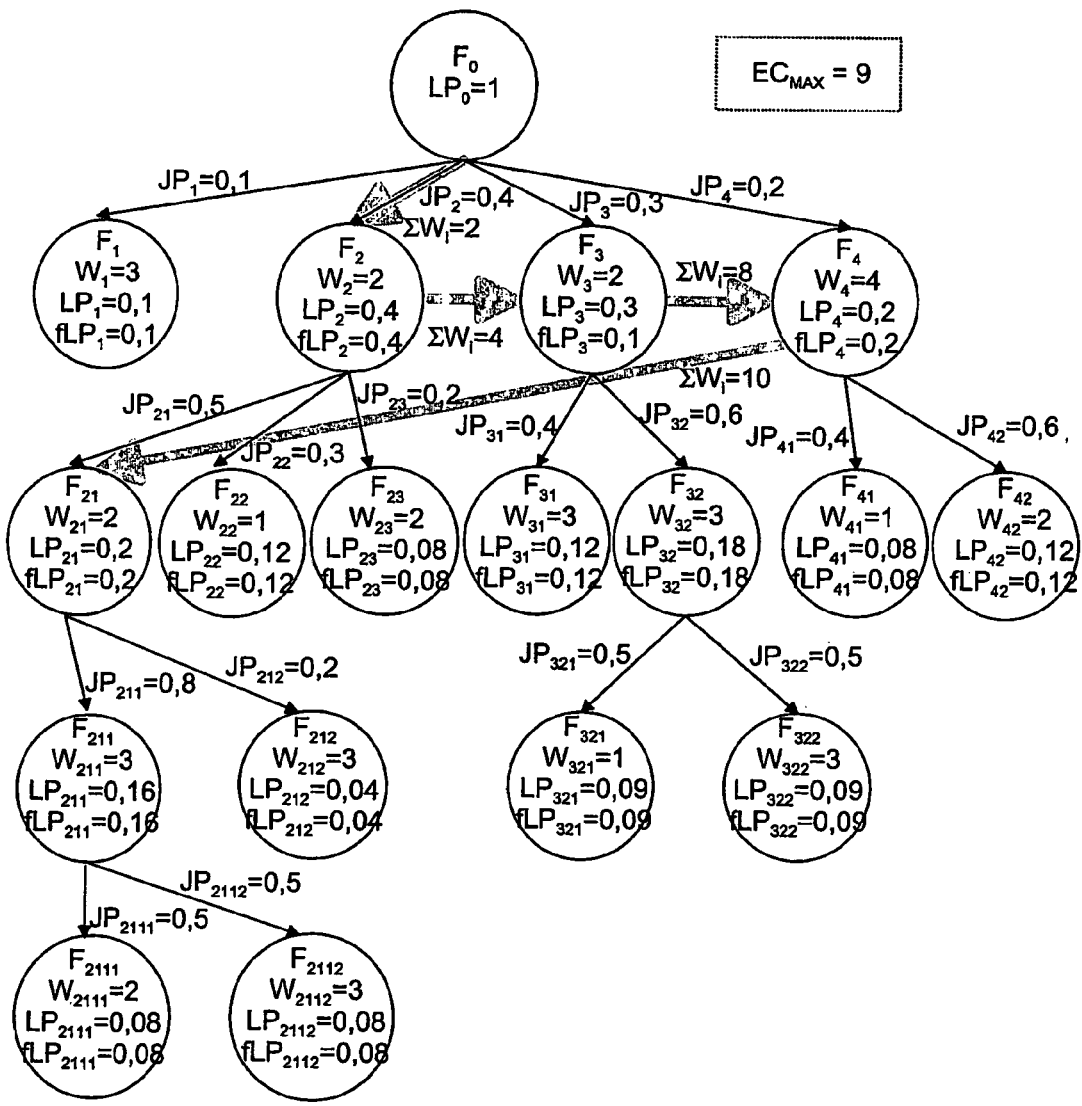
FIG. 5 shows a preferred embodiment of the invention as a probability tree.

After determining the energy consumptions $W_i$, joint probabilities $JP_i$, loading probabilities $LP_i$, loading probability functions $fLP_i$ and maximum energy consumption $EC_{MAX}$, the files are arranged as a probability tree PT according to FIG. 5. Subsequently, the files are loaded in the loading probability function order from the greatest to the smallest until the value of the total energy consumption $\Sigma W_i$ caused by the loading of the files is greater than the value of the maximum-energy consumption $EC_{MAX}$. In this embodiment, the files are loaded in the order ($F_2$, $F_3$, $F_4$, $F_{21}$). For instance file $F_{32}$ is not loaded, because the maximum energy consumption $EC_{MAX}$ is exceeded during the loading of file $F_{21}$.

Figure 6:
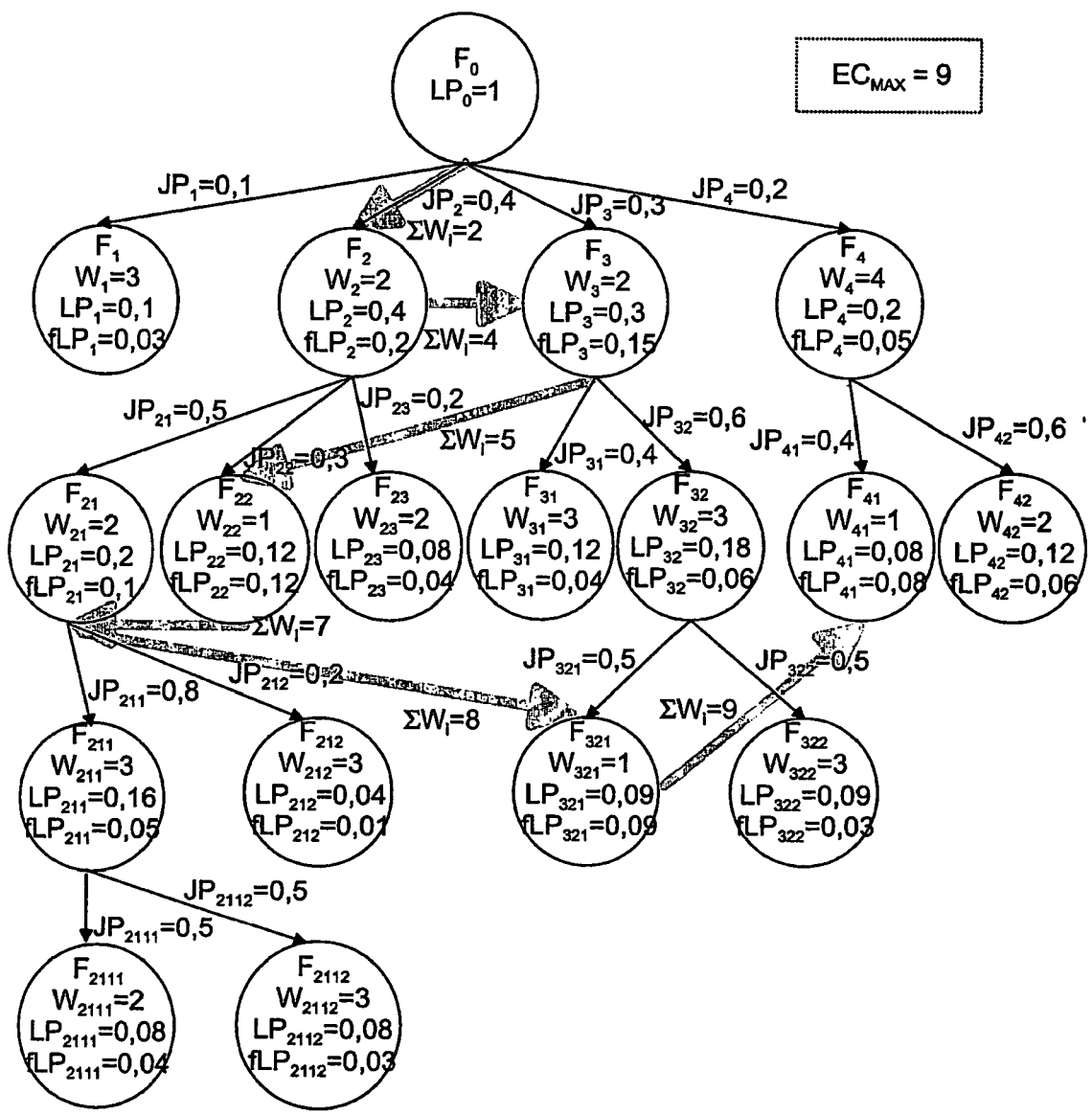
FIG. 6 shows the second preferred embodiment of the invention as a probability tree.

FIG. 6 shows a second preferred embodiment of the invention, in which, according to the preferred embodiment of FIG. 5, the energy consumptions ($W_1$, $W_2$, $W_3$, $W_4$) caused by the loading of possible files ($F_1$, $F_2$, $F_3$, $F_4$) and loading probabilities ($LP_1$, $LP_2$, $LP_3$, $LP_4$) for the files ($F_1$, $F_2$, $F_3$, $F_4$) are determined as a product ($LP_1=JP_1 \times LP_0$, $LP_2=JP_2 \times LP_0$, $LP_3=JP_3 \times LP_0$ and $LP_4=JP_4 \times LP_0$) of the joint probability ($JP_1$, $JP_2$, $JP_3$, $JP_4$) of each file ($F_1$, $F_2$, $F_3$, $F_4$) and the loading probability ($LP_0$) of the file ($F_0$) preceding the files ($F_1$, $F_2$, $F_3$, $F_4$). The difference is, however, that in this preferred embodiment the loading probability function $fLP_i$ of each file $F_i$ is proportional not only to the loading probability $LP_i$ but also to the energy consumption $W_i$ caused by the loading. The loading probability function $fLP_i$ determining the loading order can thus be, for example, a ratio of the loading probability $LP_i$ of the file $F_i$ and the energy consumption $W_i$ caused by the loading, i.e. $LP_i=LP_i/W_i$. In such a case, the files having a high loading probability $LP_i$ and/or low energy consumption are loaded first. In addition, maximum energy consumption $EC_{MAX}$ is determined, as in the previous embodiments. The above-mentioned values are determined in a corresponding way for other possible files $F_i$.

Files are loaded in the loading probability function order from the smallest to the greatest until the value of the total energy consumption $\Sigma W_i$ caused by the loading of the files is greater than or equal to the value of the maximum energy consumption $EC_{MAX}$. In this embodiment, the files are loaded in the order ($F_2$, $F_3$, $F_{22}$, $F_{21}$, $F_{321}$, $F_{41}$). File $F_{32}$, for instance, is not loaded, because the value of the total energy consumption $\Sigma W_i$ exceeds the value of the maximum energy consumption $EC_{MAX}$ during the loading of file $F_{41}$.

According to a preferred embodiment of the invention, energy consumptions ($W_i$) and the greatest allowed value $EC_{MAX}$ of the energy consumption caused by the loading of the files $F_i$ or clips $C_i$ thereof are determined for the files $F_i$ of clips $C_i$ thereof possibly to be loaded, but the relative probabilities of the files $F_i$ or clips $C_i$ thereof are not known. Thus, the joint probabilities $JP_i$ of the files $F_i$ or clips $C_i$ thereof are determined in such a way that the joint probability of the first files $F_{iA}$ possibly to be loaded or clips $C_{iA}$ thereof is as follows: $JP_{iA}=1/N_A$, where $N_A$ is the number of first files $F_{iA}$ possibly to be loaded. The joint probability of the next files $F_{iB}$ possibly to be loaded or clips $C_{iB}$ thereof is as follows: $JP_{iB}=1/(N_A \times N_B)$, where $N_B$ is the number of the next files $F_{iB}$ possibly to be loaded or clips $C_{iB}$ thereof. The joint probability of the third files $F_{iC}$ possibly to be loaded or clips $C_{iC}$ thereof is as follows: $JP_{iC}=1/(N_A \times N_B \times N_C)$, where $N_C$ is the number of third files $F_{iC}$ or clips $C_{iC}$ thereof possibly to be loaded. Joint probabilities $JP_i$ are formed in a corresponding way for other files $F_i$ or clips $C_i$ thereof possibly to be loaded. The loading probability $LP_i$ is determined as, a function of the joint probability $JP_i$, and the loading probability function $fLP_i$ is determined as a function of the loading probability $LP_i$. Files $F_i$ or clips $C_i$ thereof are loaded in a random order, for example, until the value of the total energy consumption $\Sigma W_i$ caused by the loading is greater than or equal to the value of the maximum energy consumption $EC_{MAX}$, at which point the loading is interrupted. Although the loading is carried out in a random order here, a statistically better system performance on average is achieved than would be without the preloading of the files $F_i$ or clips $C_i$ thereof, because with a predictive probability arrangement the file $F_i'$ needed may have been preloaded, in which case its access and loading times are short.

Figure 7:
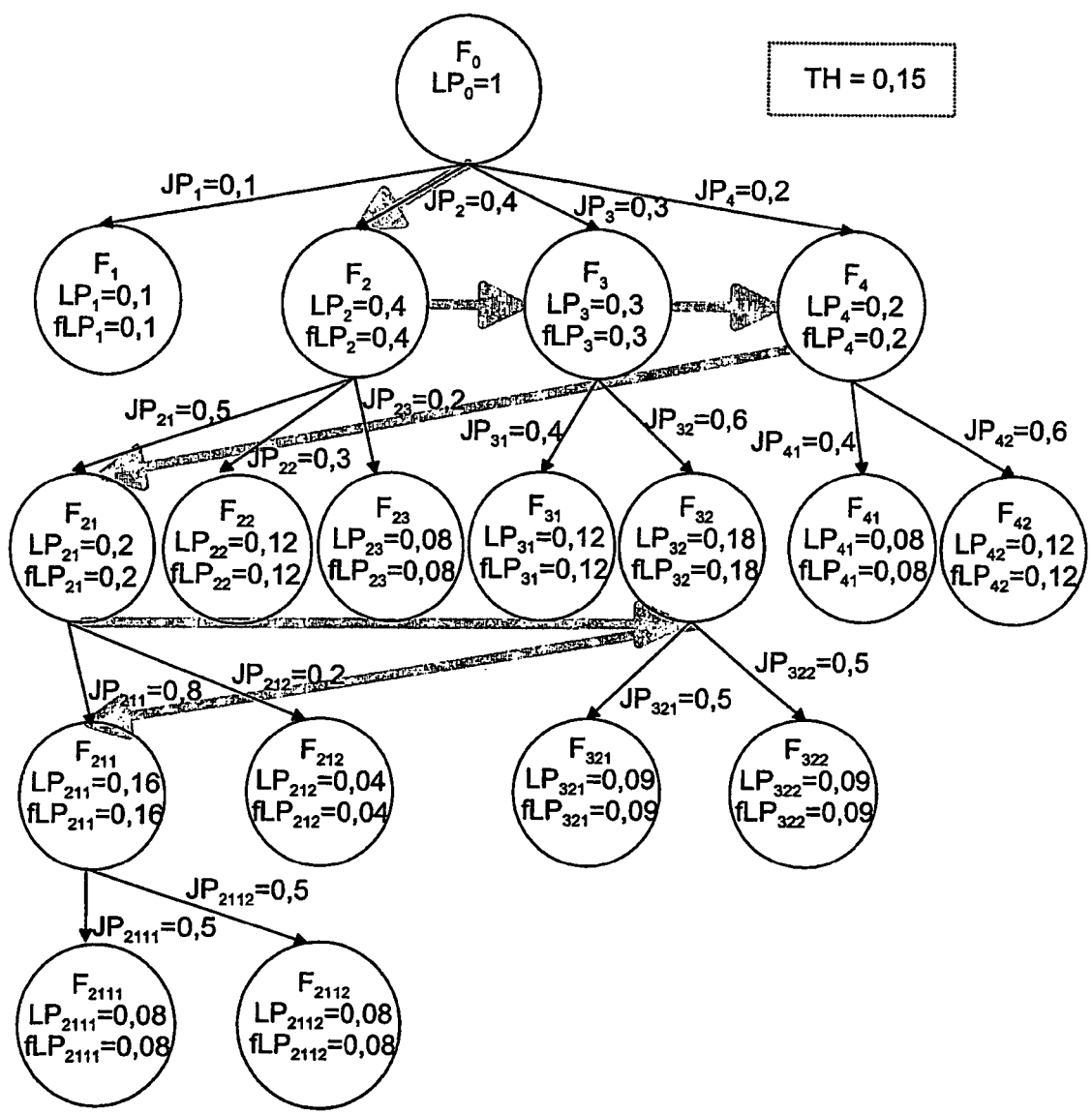
FIG. 7 shows the third preferred embodiment of the invention as a probability tree.

FIG. 7 shows a third preferred embodiment of the invention, in which a threshold value TH is determined for the probability method, which value the loading probability function $fLP_i$ of the file $F_i$ or a clip $C_i$ thereof must at least have in order for the file $F_i$ or a clip $C_i$ thereof to be loaded. In the case of FIG. 7, the threshold value TH is determined to be 0.15. The algorithm according to the invention determines joint probabilities ($JP_1$, $JP_2$, $JP_3$, $JP_4$) for the files ($F_1$, $F_2$, $F_3$, $F_4$), on the basis of which the loading order is determined for the files $F_i$ or clips $C_i$ thereof. Also loading probabilities ($LP_1$, $LP_2$, $LP_3$, $LP_4$) of the files ($F_1$, $F_2$, $F_3$, $F_4$) can be determined with the method as a product ($LP_1=JP_1 \times LP_0$, $LP_2=JP_2 \times LP_0$, $LP_3=JP_3 \times LP_0$ and $LP_4=JP_4 \times LP_0$) of the loading probability $LP_0$ of each file ($F_1$, $F_2$, $F_3$, $F_4$) and the file ($F_0$) preceding the files ($F_1$, $F_2$, $F_3$, $F_4$). In this example, the loading probability function $fLP_i$ of each file $F_i$ is directly the loading probability $LP_i$ of the file $F_i$. The above-mentioned values are determined in a corresponding way for other possible files $F_i$.

After determining the threshold value TH and the joint probabilities $JP_i$, the files are arranged as a probability tree PT according to FIG. 7. After this, the files are loaded in the loading order until the probability function $JP_i$ of the next file $F_i$ to be loaded or its function is lower than the threshold value TH. Thus file $F_{22}$, for example, is not loaded. In this embodiment, the files are loaded in the order ($F_2$, $F_3$, $F_4$, $F_{21}$, $F_{32}$, $F_{211}$).

The predictive probability method according to the invention can be implemented with a predictive probability system according to the invention. The system comprises means for determining the energy consumptions $W_i$ caused by the loading of the files $F_i$ or clips $C_i$ thereof, joint probabilities $JP_i$ of the files $F_i$ or clips $C_i$ thereof, and maximum energy consumption $EC_{MAX}$. The functions of the system can preferably be performed with a server S or a terminal T, or performance of the functions can be divided between different units, such as the server S and the terminal T.

According to a preferred embodiment of the invention, the functionality of the system can be implemented with a driver DR comprised by the system, a program code, in the driver being arranged to form the files $F_i$ or clips $C_i$ thereof in the loading order and to control the loading. The functionality of the system can also be implemented in such a way, for example, that what are called intelligent functionalities, such as determination of the loading order, are arranged to be performed in the application AP, and the driver DR is arranged to search files $F_i$ or clips $C_i$ thereof. The driver DR can also be what is called an intelligent unit, which performs intelligent functions in addition to searching files $F_i$ or clips $C_i$ thereof, or the driver DR can perform intelligent functions, being, however, in functional connection to another driver DR', which is arranged to perform the searches of files $F_i$ or clips $C_i$ thereof.

The above describes a predictive probability method and system for loading files $F_i$ or clips $C_i$ thereof over an interface IF. According to a preferred embodiment, the predictive probability functionality can be achieved with, a software product which preferably comprises a program code for determining the maximum energy consumption $EC_{MAX}$, energy consumptions $W_i$ caused by the loading of the files $F_i$ or clips $C_i$ thereof and joint probabilities $JP_i$. The software product further comprises a software code for forming the loading order of the files $F_i$ or clips $C_i$ thereof as functions of the joint probabilities $JP_i$, for loading files $F_i$ or clips $C_i$ thereof, and for interrupting the loading when the value of the total energy consumption $\Sigma W_i$ is greater than or equal to the value of the maximum energy consumption $EC_{MAX}$.

Figure 8:
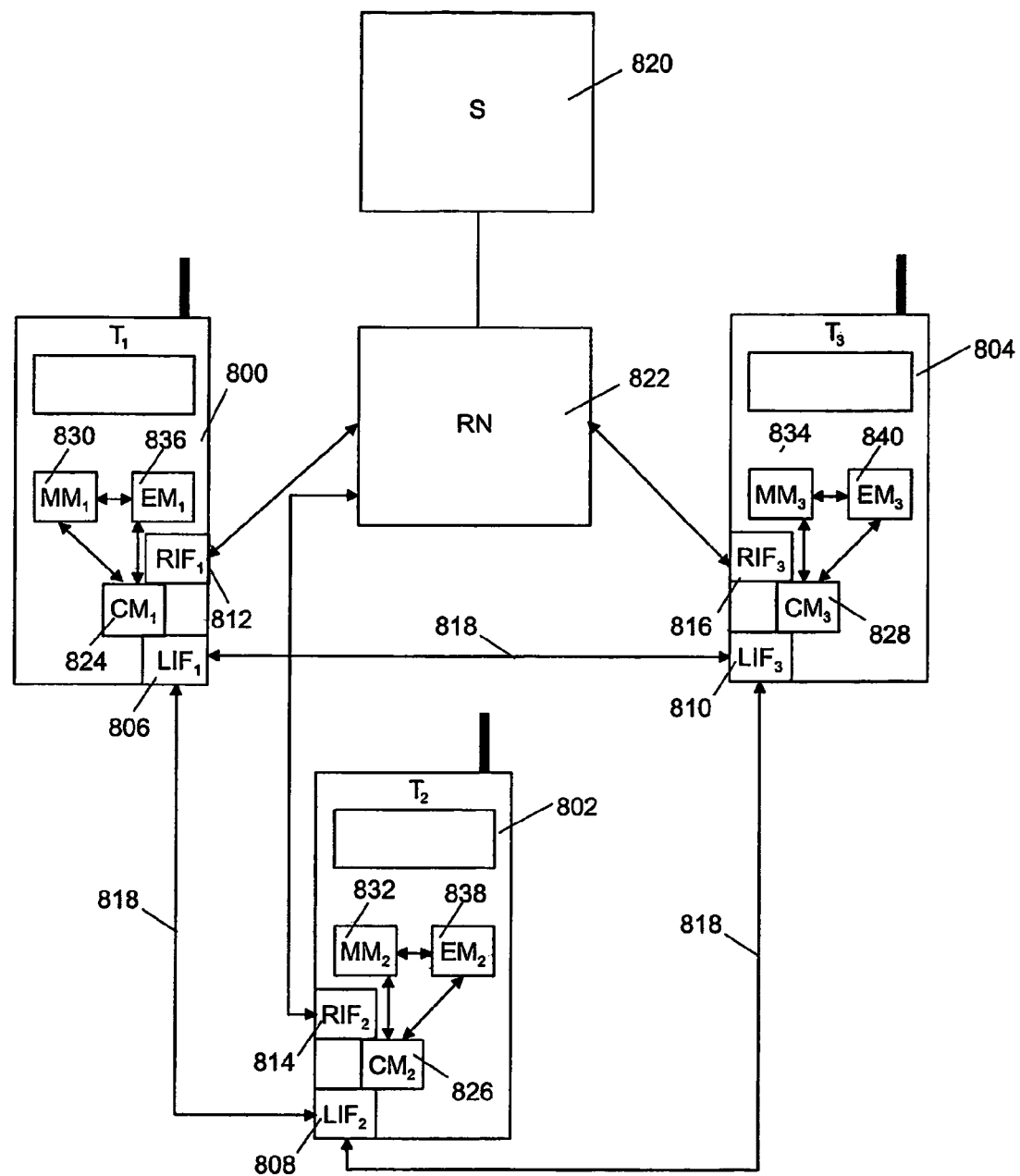
FIG. 8 shows the fourth preferred embodiment of the invention.

FIG. 8 shows the fourth preferred embodiment of the invention for optimising data transmission. The method allows the user or system to optimise, for example, energy and cost per bit according to energy consumption or loading speed, for example.

A local network connection (818), such as Bluetooth or WLAN connection, is established between electronic devices, such as a first, a second and a third mobile terminal $T_1$ (800), $T_2$ (802) and $T_3$ (804) comprising local network interface $LIF_1$ (806), $LIF_2$ (808), $LIF_3$ (810). One or more of the terminals $T_1$, $T_2$, $T_3$ comprising remote network interface $RIF_1$ (812), $RIF_2$ (814), $RIF_3$ (816) are also linked to a data unit, such as data server S (820) comprising files or clips thereof via a remote network RN (822), such as GPRS. The server S may comprise a large amount of data linked by means of an Internet connection, for example. Files $F_i$ or clips $C_i$ thereof needed by the terminals $T_1$, $T_2$, $T_3$ are chosen and loaded by the earlier described predictive probability method from the data server S over the interface to the terminal $T_1$, $T_2$, $T_3$ memory, for example cache memory $CM_1$ (824), $CM_2$ (826), $CM_3$ (828).

According to a preferred embodiment of the invention, the terminals $T_1$, $T_2$, $T_3$ comprise also mass memory $MM_1$ (830), $MM_2$ (832), $MM_3$ (834), in which data can be saved for a longer period. Each of the terminals $T_1$, $T_2$, $T_3$ can be considered to be a proxy server for the other terminals $T_1$, $T_2$, $T_3$ linked to it directly or via one or more other terminals $T_1$, $T_2$, $T_3$. Files $F_i$ or clips $C_i$ thereof can be further loaded from terminal $T_1$, $T_2$, $T_3$ to other terminals $T_1$, $T_2$, $T_3$ cache memories $CM_1$ (818), $CM_2$ (820), $CM_3$ (822) for example via the Bluetooth connection. The files $F_i$ or clips $C_i$ thereof can then be transmitted to the terminal $T_1$, $T_2$, $T_3$ executable memory $EM_1$ (836), $EM_2$ (838), $EM_3$ (840) in the terminal $T_1$, $T_2$, $T_3$ when needed.

According to a preferred embodiment of the invention, the proxy functionality may be implemented in some other device than the terminal T such as in an intermediate server between the terminal and the unit FU. The loading algorithm described above only needs to be modified such that the maximum energy consumption $EC_{MAX}$ for the file $F_i$ or clip $C_i$ thereof needs to be modified according to the interface in question. Usually the transmission over the local network is cheaper than over the remote network. Thus, the arrangement makes it possible to take user cost into account.

It will be obvious to a person skilled in the art that as the technology advances, the basic idea of the invention can be implemented in a plurality of ways. For example, the probability tree can be created in a manner other than the one described here. Further, the invention can also be applied to systems other than the one described here. Two memory components and an arrangement comprising an interface between them is a simplified model from which it is possible to derive other arrangements to which the invention can be applied. Thus, the invention and its embodiments are not limited to the above examples, but can vary within the scope of the claims.

The invention claimed is:

1. A method of loading at least one file or a part ("clip") thereof from a unit comprising files or clips thereof over an interface to a data-processing unit, the method comprising:
   determining, using a computing device, joint probabilities of at least two files or thereof, which joint probabilities express probabilities with which one moves to said files or clips thereof;
   determining energy consumptions caused by the loading of said at least two files or clips thereof over the interface,
   forming a loading order for said files or clips thereof as a function of said joint probabilities;
   determining a value for maximum energy consumption, the value expressing the greatest allowed energy consumption caused by said loading; and
   loading files or clips thereof in said loading order and determining total energy consumption caused by the loading until the value of said total energy consumption exceeds the value of the maximum energy consumption.

2. A method according to claim 1, the method further comprising:
   determining loading probabilities of said files or clips thereof as a function of said joint probabilities.

3. A method according to claim 2, the method further comprising:
   determining loading probability functions of said files or clips thereof as a function of the loading probabilities.

4. A method according to claim 2, the method further comprising:
   determining loading probability functions of said files or clips thereof as a function of the loading probabilities and the energy consumptions caused by the loading.

5. A method according to claim 1, by the method comprising:
   determining the value of said energy consumptions, maximum energy consumption and joint probabilities periodically.

6. A method according to claim 1, the method comprising:
   redetermining the values of said maximum energy consumption according to the interface in question.

7. A method according to claim 3, the method comprising:
   updating the values of said loading probabilities and loading probability functions as a response to said determination.

8. A method according to claim 1, the method comprising:
   loading at least one file or a clip thereof over said interface alternatively from a server to a terminal or from a first memory component to a second memory component.

9. A method according to claim 1, the method comprising:
loading at least one file or a clip thereof over said interface alternatively from a first terminal to a second terminal over a local network interface.

10. A method according to claim 1,
the method comprising: loading at least one file or a clip thereof from a mass memory component to another memory component over an internal interface.

11. A method of loading at least one file or a clip thereof from a unit comprising files or clips thereof over an interface to a data-processing unit, the method comprising:
determining, using a computing device, joint probabilities of at least two files or clips thereof, which joint probabilities express probabilities with which one moves to said files or clips thereof;
forming a loading order for said files or clips thereof as a function of said joint probabilities;
determining a threshold value, which expresses a value, which the value determined as a function of the joint probability of the file or a clip thereof must at least reach in order for the file or a clip thereof to be loaded; and
loading files or clips thereof in said loading order and comparing the values determined as functions of the joint probabilities of the files or clips thereof with the threshold value until the value determined as the function of the joint probability of the file or a clip thereof is smaller than the threshold value 12. A system for loading at least one file or a clip thereof from a unit comprising files or clips thereof over an interface to a data-processing unit, wherein the system comprises:
means for determining joint probabilities of at least two files or clips thereof, which joint probabilities express probabilities with which one moves to said files or clips thereof;
means for determining the energy consumption caused by the loading of said at least two files or clips thereof;
means for determining the loading order of said files or clips thereof as a function of said joint probabilities;
means for determining the value of maximum energy consumption, which expresses the greatest allowed energy consumption caused by said loading; and
means for loading files or clips, thereof and determining the total energy consumption caused by the loading of the files or clips thereof, the means being arranged to load files or clips thereof until the value of the total energy consumption exceeds the value of the maximum energy consumption.

13. A system according to claim 12, wherein
at least part of said means is executed as a program code of a driver comprised by the system.

14. A device for loading at least one file or a clip thereof from a unit comprising files or clips thereof over an interface, wherein the the device comprises:
means for determining joint probabilities of at least two files or clips thereof, which joint probabilities express probabilities with which one moves to said files or clips thereof;
means for determining the energy consumptions caused by the loading of said at least two files or clips thereof;
means for determining the loading order of said files or clips thereof as a function of said joint probabilities
means for determining the value of maximum energy consumption, which expresses the greatest allowed energy consumption caused by said loading; and
means for requesting files or clips thereof and determining the total energy consumption caused by the loading, the means being configured to load files or clips thereof until the value of said total energy consumption exceeds the value of the maximum energy consumption.

15. A device according to claim 14, the device further comprises:
proxy functionality, which is configured to transmit at least one file or a clip thereof to another data-processing unit as a response to a request from the data-processing unit.

16. A computer-readable medium having instructions stored thereon that, if executed by a processing device, causes the processing device to perform a method comprising:
determining joint probabilities of at least two files or clips thereof, with which probabilities one moves to said files or clips thereof,
determining the energy consumptions caused by said at least two files or clips thereof,
forming the loading order of said files or clips thereof as a function of said joint probabilities;
determining the value of the maximum energy consumption, which expresses the greatest allowed energy consumption caused by said loading; and
loading files or clips thereof and determining the total energy consumption caused by the loading of said files or clips thereof until the value of said total energy consumption exceeds the value of the maximum energy consumption.

17. A method according to claim 4, the method comprising:
updating the values of said loading probabilities and loading probability functions as a response to said determination.

* * * * *

UNITED STATES PATENT AND TRADEMARK OFFICE
CERTIFICATE OF CORRECTION

PATENT NO. : 7,565,264 B2
APPLICATION NO. : 10/535074
DATED : July 21, 2009
INVENTOR(S) : Mäkelä et al.

It is certified that error appears in the above-identified patent and that said Letters Patent is hereby corrected as shown below:

Column 10, line 25, please amend "files or thereof" to read "files or clips thereof";

Column 10, line 54, please amend "determining" to read "redetermining";

Column 11, line 46, please amend "files or clips, thereof" to read "files or clips thereof"; and Column 12, line 14, please amend "probabilities" to read "probabilities;".

Signed and Sealed this

Twentieth Day of October, 2009

David J. Kappos
*Director of the United States Patent and Trademark Office*